United States Patent
Quesada et al.

(10) Patent No.: US 11,600,255 B2
(45) Date of Patent: Mar. 7, 2023

(54) ACOUSTIC PANEL CORE WITH MULTI-MATERIAL AND/OR MULTI-LAYERED CONSTRUCTION

(71) Applicant: Rohr, Inc., Chula Vista, CA (US)

(72) Inventors: Marc W. Quesada, Yucaipa, CA (US); Jose S. Alonso-Miralles, Chula Vista, CA (US); Kathryn Mireles, San Diego, CA (US); Michael Scamardo, Rancho Cucamonga, CA (US); Yves Klett, Gerlingen (DE)

(73) Assignee: Rohr, Inc., Chula Vista, CA (US)

( * ) Notice: Subject to any disclaimer, the term of this patent is extended or adjusted under 35 U.S.C. 154(b) by 253 days.

(21) Appl. No.: 17/130,463

(22) Filed: Dec. 22, 2020

(65) Prior Publication Data

US 2022/0199062 A1 Jun. 23, 2022

(51) Int. Cl.
| | |
|---|---|
| *G10K 11/168* | (2006.01) |
| *B64C 1/40* | (2006.01) |
| *B64D 33/00* | (2006.01) |
| *B64D 33/02* | (2006.01) |
| *F02C 7/24* | (2006.01) |
| *F02K 1/82* | (2006.01) |

(52) U.S. Cl.
CPC .............. *G10K 11/168* (2013.01); *B64C 1/40* (2013.01); *B64D 33/00* (2013.01); *B64D 2033/0206* (2013.01); *F02C 7/24* (2013.01); *F02K 1/827* (2013.01)

(58) Field of Classification Search
CPC .................. G10K 11/168; B64D 33/00; B64D 2033/0206; F02C 7/045; F02C 7/24; B64C 1/40; F02K 1/827
See application file for complete search history.

(56) References Cited

U.S. PATENT DOCUMENTS

| | | | |
|---|---|---|---|
| 3,542,152 A | 11/1970 | Adamson | |
| 3,734,234 A * | 5/1973 | Wirt | F02K 1/827 |
| | | | 428/116 |
| 8,955,643 B2 | 2/2015 | Liu | |
| 9,469,985 B1 | 10/2016 | Ichihashi | |
| 10,332,501 B2 | 6/2019 | Lin | |
| 10,695,986 B2 | 6/2020 | Gurney | |
| 2010/0115964 A1 | 5/2010 | Kirby | |
| 2017/0167291 A1* | 6/2017 | Koroly | F01D 25/04 |
| 2018/0229829 A1* | 8/2018 | Pierick | B32B 37/06 |

(Continued)

FOREIGN PATENT DOCUMENTS

| | | |
|---|---|---|
| EP | 2365483 B1 | 4/2012 |
| GB | 1406844 A | 9/1975 |

OTHER PUBLICATIONS

EP search report for EP21216385.1 dated May 19, 2022.

*Primary Examiner* — Jeremy A Luks
(74) *Attorney, Agent, or Firm* — Getz Balich LLC

(57) ABSTRACT

An acoustic panel is provided that includes a perforated first skin, a second skin and a corrugated structure. The corrugated structure is between and is connected to the perforated first skin and the second skin. The corrugated structure includes a first baffle, a first septum, first material and second material that is configured with the first material. The first baffle is formed by an uninterrupted portion of the first material. The first septum is formed by a portion of the second material that is exposed through an interruption in the first material.

14 Claims, 14 Drawing Sheets

(56) References Cited

U.S. PATENT DOCUMENTS

| | | |
|---|---|---|
| 2019/0039745 A1 | 2/2019 | Haile |
| 2019/0054999 A1 | 2/2019 | Narayanan Nampy |
| 2020/0103139 A1 | 4/2020 | Schiller |
| 2020/0191091 A1 | 6/2020 | Gurvich |
| 2020/0386187 A1 | 12/2020 | Kelford |

* cited by examiner

ACOUSTIC PANEL CORE WITH MULTI-MATERIAL AND/OR MULTI-LAYERED CONSTRUCTION

BACKGROUND

1. Technical Field

This disclosure relates generally to acoustic panels such as, but not limited to, an acoustic panel for attenuating sound generated by an aircraft propulsion system.

2. Background Information

Acoustic panels may be used in various applications to attenuate noise. An acoustic panel, for example, may be configured with a nacelle of an aircraft propulsion system to attenuate noise generated by a gas turbine engine. Such an acoustic panel typically includes a honeycomb core connected between a perforated face skin and a non-perforated back skin. The honeycomb core includes a plurality of resonating chambers.

The acoustic panel may be configured as a single degree of freedom (SDOF) acoustic panel, where each resonating chamber extends through the honeycomb core unobstructed between the face skin and the back skin. Alternatively, the acoustic panel may be configured as a double-degree of freedom (DDOF) acoustic panel, where each resonating chamber is divided by a septum into two fluidly coupled sub-chambers. While various types and configurations of double-degree of freedom acoustic panels are known in the art, there is still room in the art for improvement. There is a need in the art therefore for an improved double-degree of freedom acoustic panel.

SUMMARY OF THE DISCLOSURE

According to an aspect of the present disclosure, an acoustic panel is provided that includes a perforated first skin, a second skin and a corrugated structure. The corrugated structure is between and is connected to the perforated first skin and the second skin. The corrugated structure includes a first baffle, a first septum, first material and second material that is configured with the first material. The first baffle is formed by an uninterrupted portion of the first material. The first septum is formed by a portion of the second material that is exposed through an interruption in the first material.

According to another aspect of the present disclosure, another acoustic panel is provided that includes a perforated first skin, a second skin and a core. The core forms a plurality of chambers that extend from the perforated first skin to the second skin. The chambers include a first chamber. The core includes a septum that divides the first chamber into a first cavity and a second cavity. The septum includes a fluid barrier region and a fluid passthrough region. The fluid barrier region is formed by first material and second material. The fluid passthrough region fluidly couples the first cavity with the second cavity. The fluid passthrough region is formed by the second material.

According to still another aspect of the present disclosure, another acoustic panel is provided that includes a perforated first skin, a second skin and a core. The core forms a plurality of chambers that extend from the perforated first skin to the second skin. The chambers including a first chamber. The core includes a septum that divides the first chamber into a first cavity and a second cavity. The septum is configured with an aperture that fluidly couples the first cavity with the second cavity. The septum includes a porous layer of material that covers the aperture.

The first material may at least include or may only include non-porous material. In addition or alternatively, the second material may at least include or may only include porous material.

The second material may be configured as or otherwise include mesh.

The second material may be configured as or otherwise include thermoplastic material.

An interruption in the first material may expose a portion of the second material that forms the fluid passthrough region.

The corrugated structure may include a layer of the first material and a layer of the second material. The layer of the second material may be laid up with and/or may be attached to the layer of the first material.

The first septum may have a first dimension in a first direction. The layer of the second material may have a second dimension in the first direction. The second dimension may be equal to the first dimension. Alternatively, the second dimension may be less than the first dimension.

The corrugated structure may also include a layer of third material. The layer of the second material may be sandwiched between the layer of the first material and the layer of the third material. The first baffle may also be formed by an uninterrupted portion of the third material. The portion of the second material may also be exposed through an interruption in the third material.

An entirety of a face the first baffle may be formed by the uninterrupted portion of the first material.

A face of the first septum may be at least partially formed by the portion of the second material.

The face of the first septum may also be formed by a second portion of the first material that defines the interruption through which the portion of the second material is exposed.

A face of the first septum may have a face area. The interruption in the first material may have a cross-sectional second area that is at least one half of the face area.

The first septum may also be formed by a second portion of the second material that is exposed through a second interruption in the first material.

The corrugated structure may also include a second baffle. A chamber may extend from the perforated first skin, along the first baffle and the second baffle, to the second skin. The first septum may divide the chamber into a first cavity and a second cavity. The second cavity may be fluidly coupled with the first cavity through one or more apertures the first septum.

The acoustic panel may also include a plurality of sidewalls between and connected to the perforated first skin and the second skin. The sidewalls may include a first sidewall and a second sidewall. The chamber may extend from the first sidewall, along the first baffle and the second baffle, to the second sidewall.

The first baffle may be connected to the first septum. The first baffle may extend between the perforated first skin and the second skin. The first septum may extend between the perforated first skin and the second skin.

At least the perforated first skin, the second skin and the corrugated structure may form a component of an aircraft propulsion system.

At least the perforated first skin, the second skin and the core may form a component of an aircraft propulsion system.

The component may be configured as a component of a nacelle for the aircraft propulsion system.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
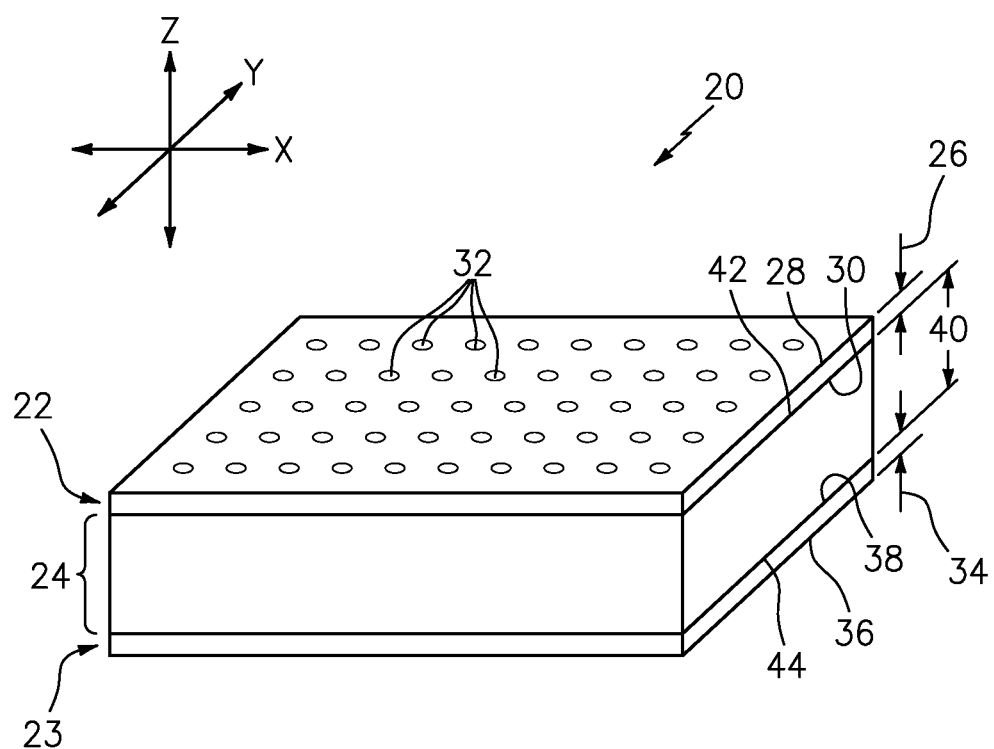
FIG. 1 is a partial perspective schematic illustration of a structural, acoustic panel for attenuating sound.

FIG. 1 is a partial perspective schematic illustration of a structural, acoustic panel 20 for attenuating sound; e.g., noise. This acoustic panel 20 may be configured to attenuate noise generated by an aircraft propulsion system such as, for example, a turbofan propulsion system or a turbojet propulsion system. With such a configuration, the acoustic panel 20 may be configured with a nacelle of the propulsion system. The acoustic panel 20, for example, may be configured as or otherwise included as part of an inner or outer barrel, a translating sleeve, a blocker door, etc. Alternatively, the acoustic panel 20 may be configured with another component/structure of the aircraft such as its fuselage or a wing. Furthermore, the acoustic panel 20 may be configured to also or alternatively attenuate aircraft related noise other than noise generated by the propulsion system. The acoustic panel 20 of the present disclosure, of course, may alternatively be configured for non-aircraft applications.

The acoustic panel 20 extends longitudinally along an x-axis. The acoustic panel 20 extends laterally along a y-axis. The acoustic panel 20 extends vertically along a z-axis. Note, the term "vertical" is used herein to describe a depthwise panel direction and is not limited to a gravitational up/down direction. Furthermore, for ease of illustration, the x-y plane is shown as a generally flat plane. However, in other embodiments, the x-y plane and, thus, the acoustic panel 20 may be curved and/or follow an undulating geometry. For example, the x-y plane and, thus, the acoustic panel 20 may be arcuate, cylindrical, conical, frustoconical, or tapered with or without radial undulations. In such embodiments, a solely vertical direction (e.g., z-axis direction) is defined relative to a position of interest on the x-y plane. For example, on a spherical x-y plane, the vertical direction (e.g., z-axis) direction is a radial direction.

The acoustic panel 20 includes a perforated first skin 22, a solid, non-perforated second skin 23 and a structural cellular core 24. Briefly, the cellular core 24 is arranged and extends vertically between the first skin 22 and the second skin 23. The cellular core 24 is also connected to the first skin 22 and/or the second skin 23. The cellular core 24, for example, may be welded, brazed, fused, adhered or otherwise bonded to the first skin 22 and/or the second skin 23. Alternatively, the cellular core 24 may be formed integral with the first skin 22 and/or the second skin 23 as a monolithic body using, for example, a molding process or an additive manufacturing process. The present disclosure, of course, is not limited to any particular manufacturing methods.

The first skin 22 is configured as a face, front and/or exterior skin of the acoustic panel 20. The first skin 22, for example, may be formed from a relatively thin sheet or layer of material that extends laterally and longitudinally along the x-y plane. This first skin material may include, but is not limited to, metal, polymer (e.g., thermoplastic or thermoset material), a fiber reinforced composite (e.g., fiber reinforcement such as, but not limited to, fiberglass, carbon fiber and/or aramid fibers within a polymer matrix), or a combination thereof. The first skin 22 has a vertical thickness 26. This first skin vertical thickness 26 extends vertically between opposing side surfaces 28 and 30 of the first skin 22. The first skin 22 includes a plurality of perforations 32; e.g., apertures such as through-holes. Each of these first skin perforations 32 extends generally vertically through the first skin 22 between the first skin side surfaces 28 and 30.

The second skin 23 is configured as a back and/or interior skin of the acoustic panel 20. The second skin 23, for example, may be formed from a relatively thin sheet or layer of (e.g., continuous, uninterrupted and/or non-porous) material that extends laterally and longitudinally along the x-y plane. This second skin material may include, but is not limited to, metal, polymer (e.g., thermoplastic or thermoset material), a fiber reinforced composite (e.g., fiber reinforcement such as, but not limited to, fiberglass, carbon fiber and/or aramid fibers within a polymer matrix), or a combination thereof. The second skin material may be the same as or different than the first skin material. The second skin 23 has a vertical thickness 34. This second skin vertical thickness 34 extends vertically between opposing side surfaces 36 and 38 of the second skin 23. The second skin vertical thickness 34 may be substantially equal to or different (e.g., greater or less) than the first skin vertical thickness 26.

The cellular core 24 extends laterally and longitudinally along the x-y plane. The cellular core 24 has a vertical thickness 40. This core vertical thickness 40 extends vertically between opposing sides 42 and 44 of the cellular core 24. These core sides 42 and 44 are respectively abutted against the interior first skin side surface 30 and the interior second skin side surface 38. The core vertical thickness 40 may be substantially greater than the first skin vertical thickness 26 and/or the second skin vertical thickness 34. The core vertical thickness 40, for example, may be at least ten to forty times (10-40×), or more, greater than the vertical thickness 26, 34; however, the acoustic panel 20 of the present disclosure is not limited to such an exemplary embodiment.

Figure 2:
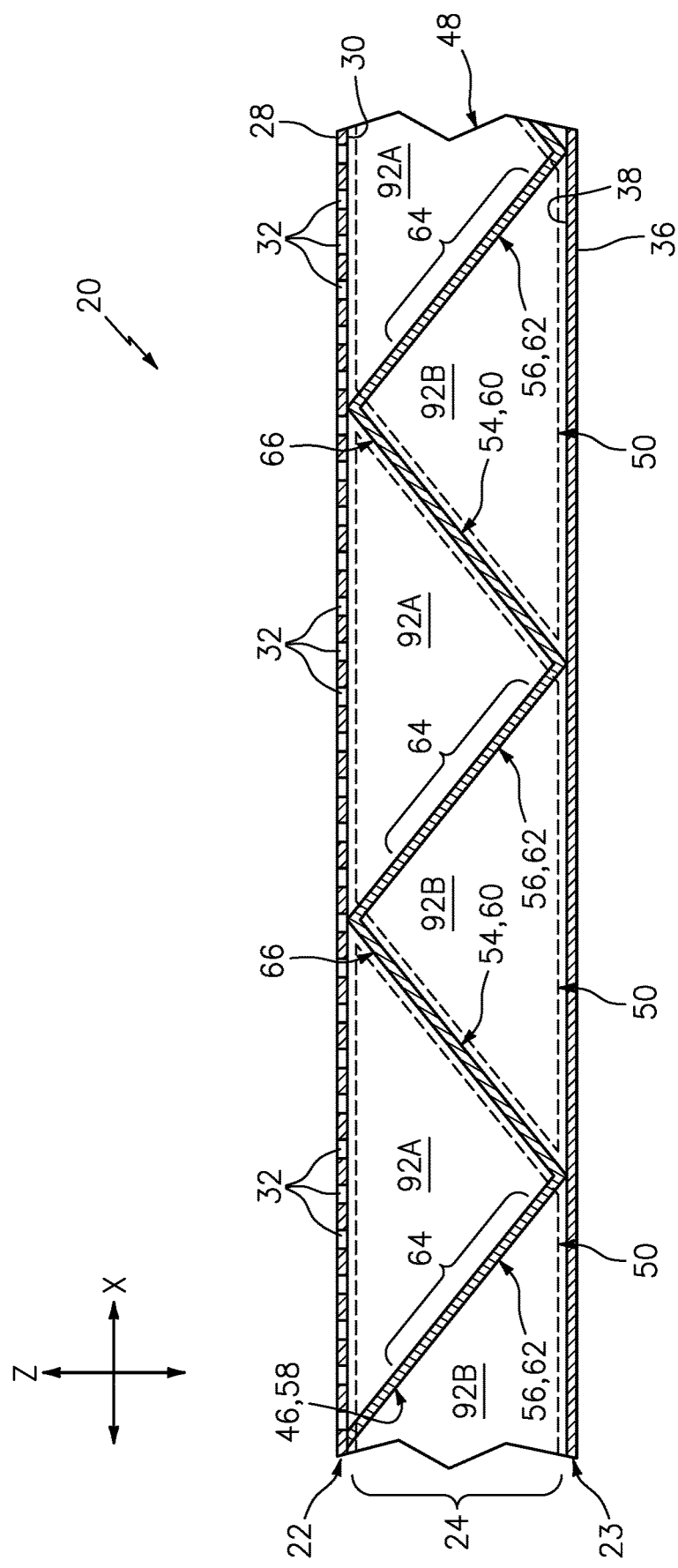
FIG. 2 is a partial side sectional illustration of the acoustic panel in an x-z plane.
Figure 3:
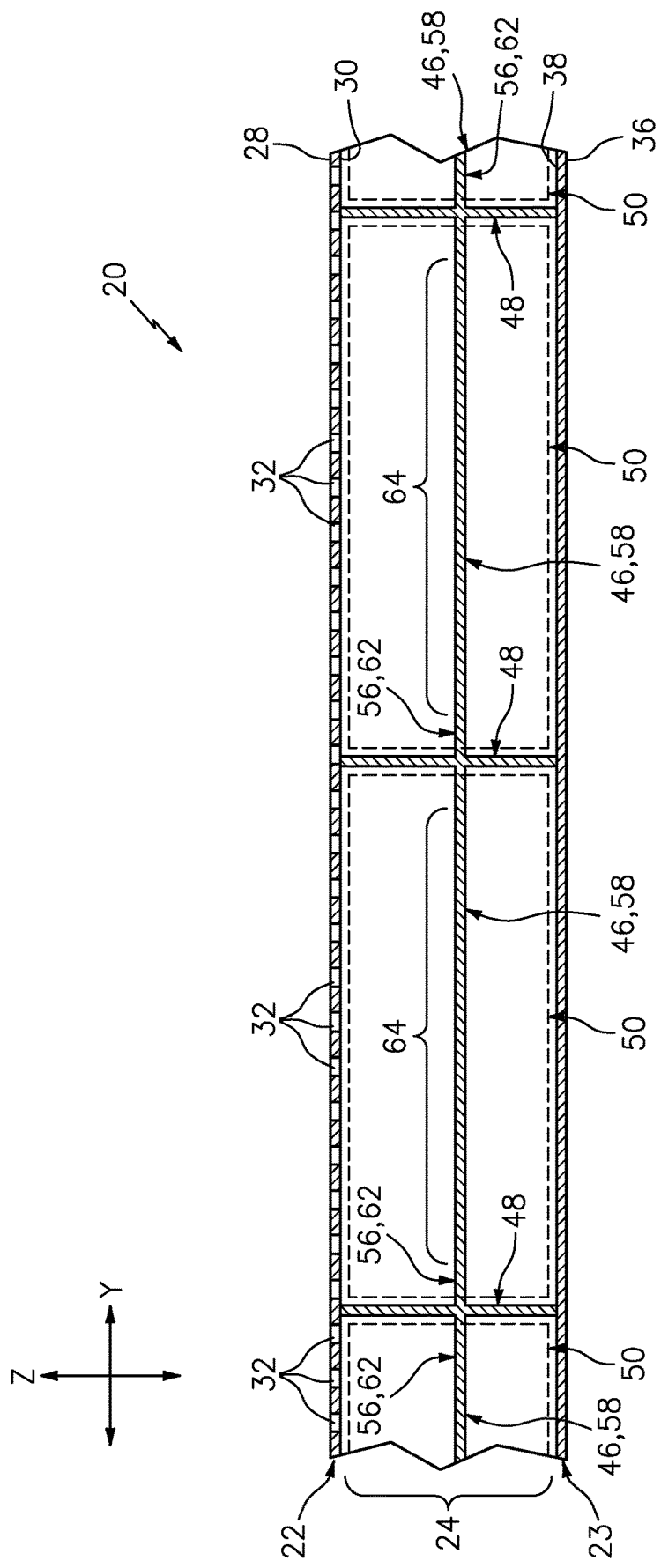
FIG. 3 is a partial side sectional illustration of the acoustic panel in a y-z plane.
Figure 4:
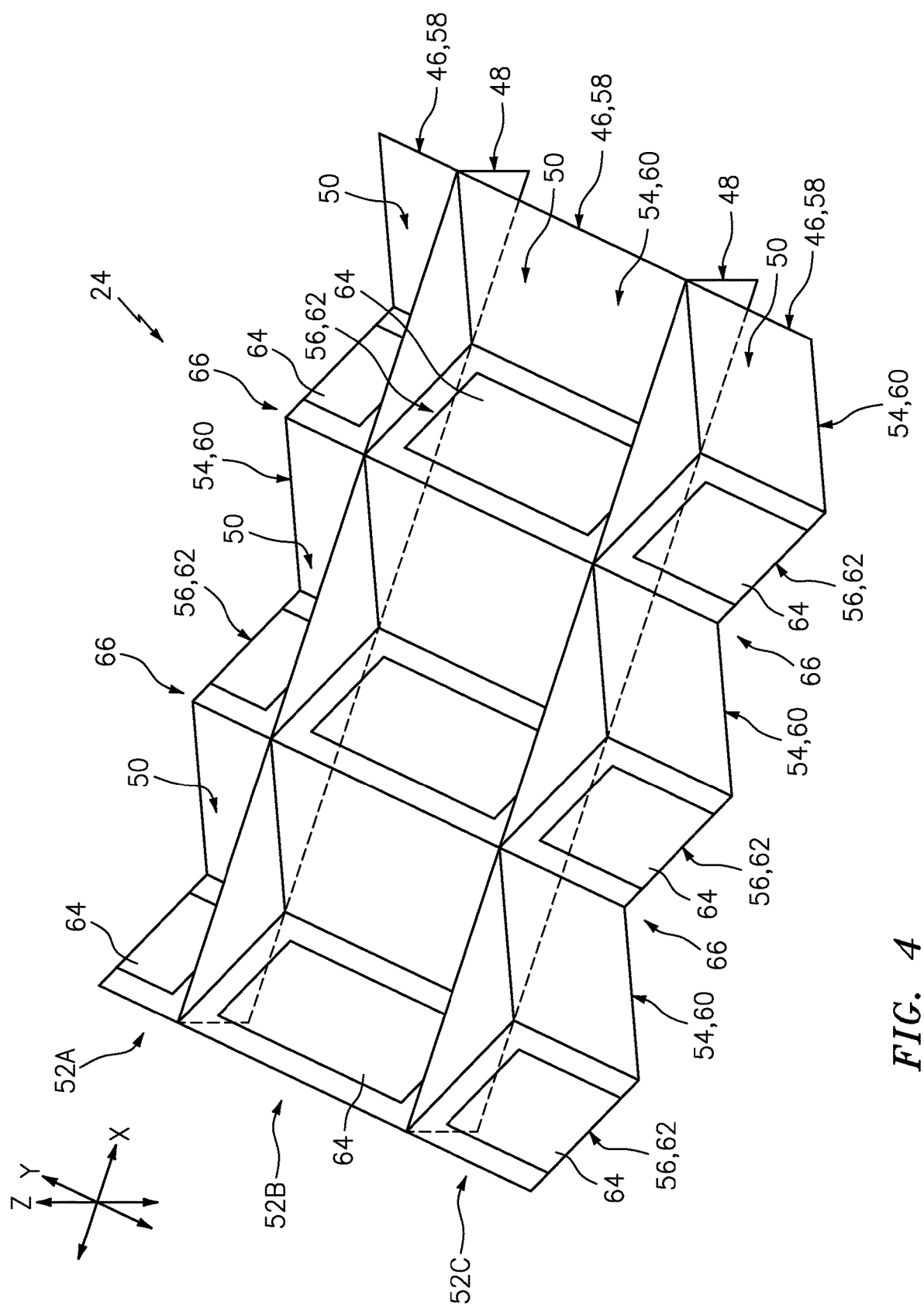
FIG. 4 is a partial perspective illustration of a cellular core for the acoustic panel.

Referring to FIGS. 2-4, the cellular core 24 includes a plurality of corrugated structures 46 and a plurality of (e.g., planar) chamber sidewalls 48. These cellular core components (e.g., 46 and 48) are arranged together to provide the cellular core 24 with a plurality of internal (e.g., resonance) chambers 50 vertically between the first skin 22 and the second skin 23 (best seen in FIGS. 2 and 3). The internal chambers 50 of FIG. 4 are arranged in one or more linear chamber arrays 52A-C (generally referred to as "52"), where each chamber array 52 extends longitudinally along the x-axis. Each chamber array 52 includes a plurality of the internal chambers 50. Each of the internal chambers 50 of FIGS. 2 and 3 is respectively fluidly coupled with one or more of the first skin perforations 32.

Referring to FIGS. 2-4, the sidewalls 48 may be arranged generally parallel with one another. The sidewalls 48 are spaced laterally from one another so as to respectively form the internal chambers 50 laterally between the sidewalls 48. Each of the sidewalls 48 thereby respectively forms lateral peripheral sides of the internal chambers 50 in at least one of the chamber arrays 52. Each intermediate sidewall 48 (e.g., a sidewall laterally disposed between two other sidewalls), for example, forms the lateral peripheral sides of the respective internal chambers 50 in a first of the chamber arrays 52 (e.g., 52A) as well as the lateral peripheral sides of the respective internal chambers 50 in a second of the chamber arrays 52 (e.g., 52B) that laterally neighbors (e.g., is immediately adjacent, next to) the first of the chamber arrays 52 (e.g., 52A). Each intermediate sidewall 48 is located laterally between the respective laterally neighboring pair of chamber arrays 52 (e.g., the first and second chamber arrays 52A and 52B). Each intermediate sidewall 48 may therefore fluidly separate the internal chambers 50 in the respective laterally neighboring pair of chamber arrays 52 (e.g., 52A and 52B) from one another.

Referring to FIG. 3, each of the sidewalls 48 extends vertically between and to the first skin 22 and the second skin 23. Each of the sidewalls 48 may also be connected (e.g., bonded and/or otherwise attached) to the first skin 22 and/or the second skin 23. Each of the sidewalls 48 is orientated substantially perpendicular to the first skin 22 and the second skin 23. However, in other embodiments, one or more of the sidewalls 48 may be angularly offset from the first skin 22 and/or the second skin 23 by a non-ninety degree angle; e.g., an acute included angle.

Each corrugated structure 46 of FIGS. 2 and 3 includes one or more first panels 54 (e.g., members, segments, etc.) and one or more second panels 56 (e.g., members, segments, etc.). These corrugated structure panels 54 and 56 are arranged together and are interconnected (e.g., in a zig-zag pattern) to provide a corrugated ribbon 58; e.g., a longitudinally elongated corrugated panel, layer, body, etc. The first panels 54 of FIG. 2 are configured as baffles 60; e.g., solid, non-porous segments of the corrugated ribbon 58. The second panels 56 of FIGS. 2 and 3 are configured as septums 62; e.g., porous segments of the corrugated ribbon 58. Each of these septums 62 includes at least one fluid passthrough region 64. Such a fluid passthrough region 64 is configured to allow fluid (e.g., air carrying sound waves) to travel across the respective septum 62 as discussed below in further detail.

Figure 5:
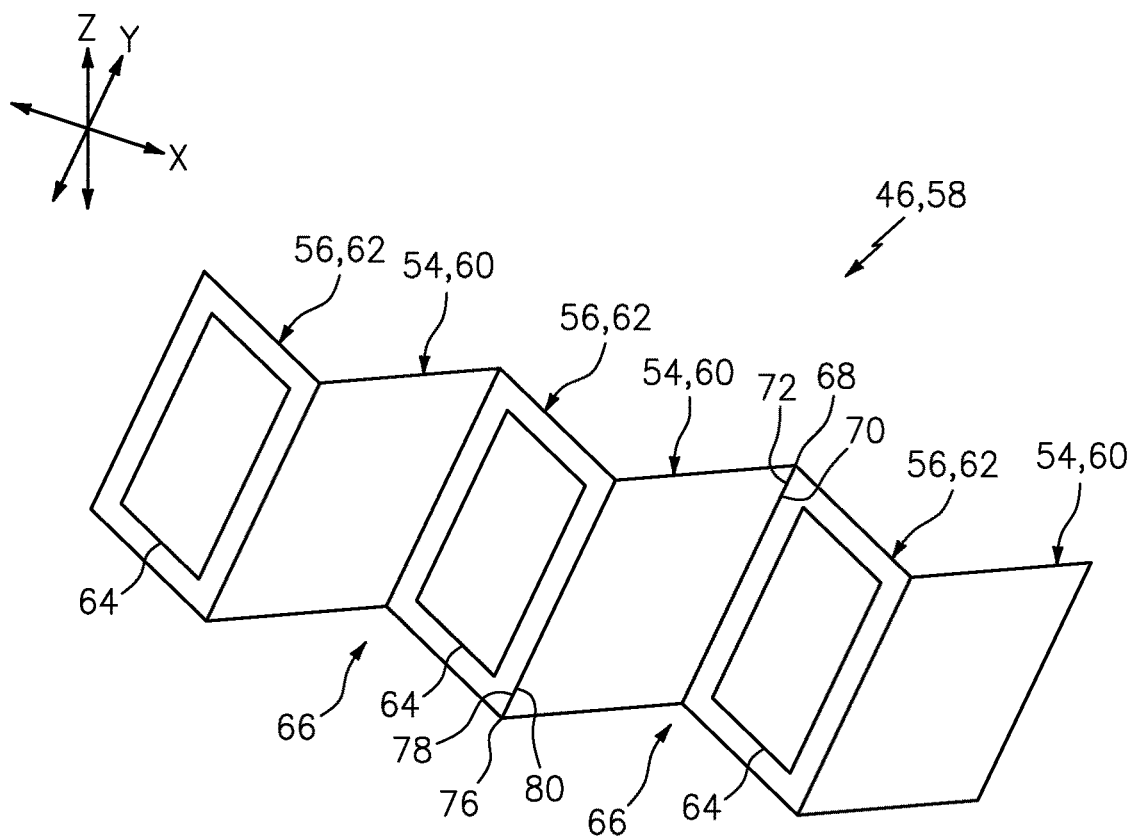
FIG. 5 is a partial perspective illustration of a corrugated structure included in the cellular core.

Referring to FIG. 5, the baffles 60 and the septums 62 are arranged together into a longitudinally extending linear array to provide a respective corrugated ribbon 58. The baffles 60 are interspersed with the septums 62. Each baffle 60 (unless configured at a longitudinal end of the sidewall 48), for example, is disposed and may extend longitudinally between and to a respective longitudinally neighboring pair of the septums 62. Similarly, each septum 62 (unless configured at a longitudinal end of the sidewall 48) is disposed and may extend longitudinally between and to a respective longitudinally neighboring pair of the baffles 60.

The corrugated structure 46 includes one or more corrugations 66. Each of these corrugations 66 includes a longitudinally neighboring pair of the elements 54 and 56, 60 and 62.

Figure 6:
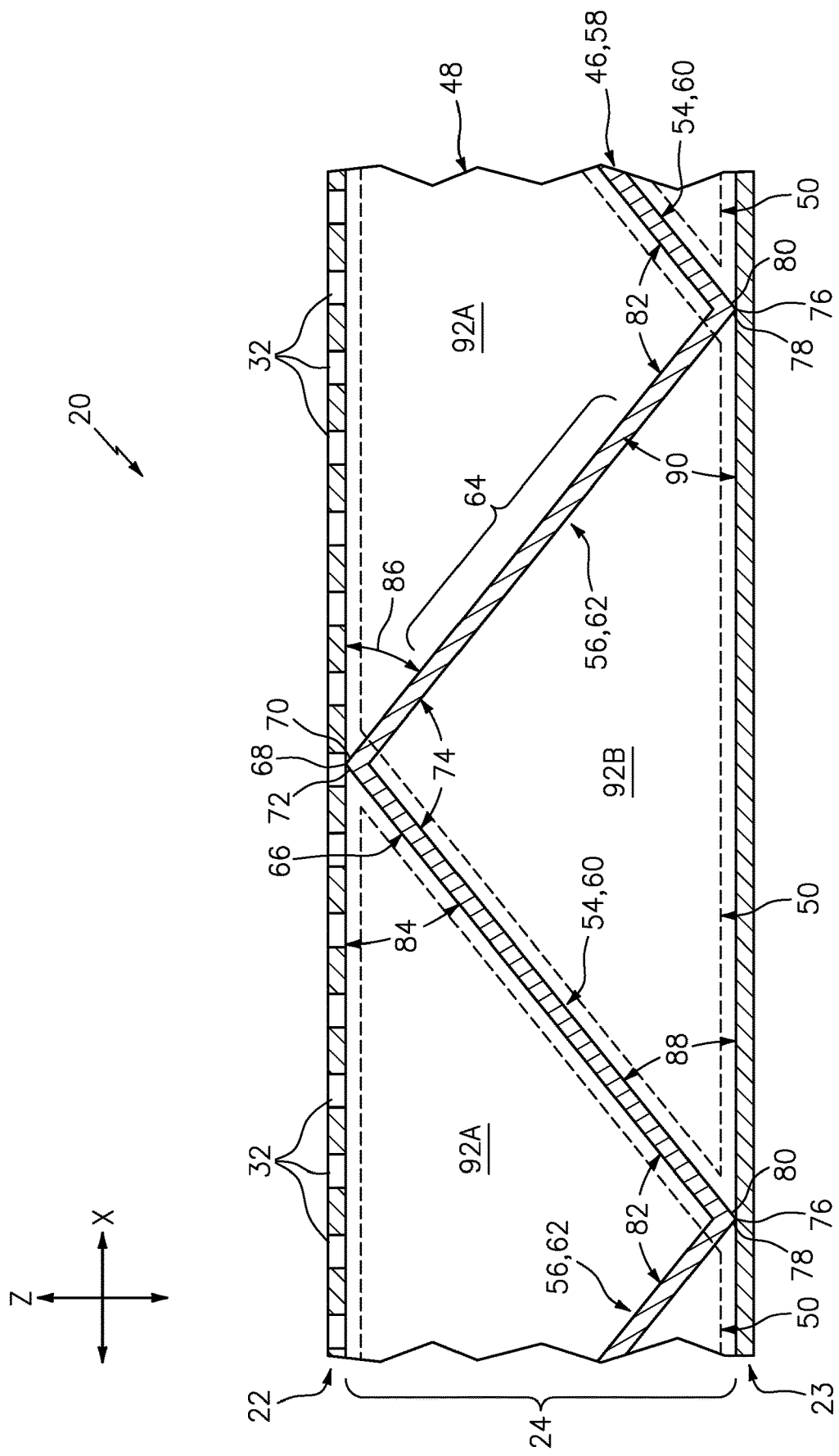
FIG. 6 is an enlarged illustration of a portion of the acoustic panel in FIG. 2.

Referring to FIG. 6, within the same corrugation 66, each baffle 60 is connected to and may meet a respective septum 62 at a peak 68 adjacent the first skin 22. Each baffle 60, for example, extends to a first end 70 thereof. Each septum 62 extends to a first end 72 thereof. Each baffle first end 70 is (e.g., directly) connected to the first end 72 of the septum 62 in the same corrugation 66 at the first skin peak 68. The baffle 60 is angularly offset from the respective septum 62 by an included angle 74; e.g., an acute angle, a right angle or an obtuse angle. This first skin peak angle 74 of FIG. 6, for example, may be between sixty degrees (60°) and one-hundred and twenty degrees (120°). The present disclosure, however, is not limited to such an exemplary first skin peak angle.

Each baffle 60 is connected to and may meet the septum 62 in a longitudinally neighboring corrugation 66 at a peak 76 adjacent the second skin 23. Each baffle 60, for example, extends to a second end 78 thereof. Each septum 62 extends to a second end 80 thereof. Each baffle second end 78 is (e.g., directly) connected to the second end 80 of the septum 62 in the longitudinally neighboring corrugation 66 at the second skin peak 76. The baffle 60 is angularly offset from the respective septum 62 by an included angle 82; e.g., an acute angle, a right angle or an obtuse angle. This second skin peak angle 82 may be equal to the first skin peak angle 74. The second skin peak angle 82 of FIG. 6, for example, may be between sixty degrees (60°) and one-hundred and twenty degrees (120°). The present disclosure, however, is not limited to such an exemplary second skin peak angle.

Figure 7:
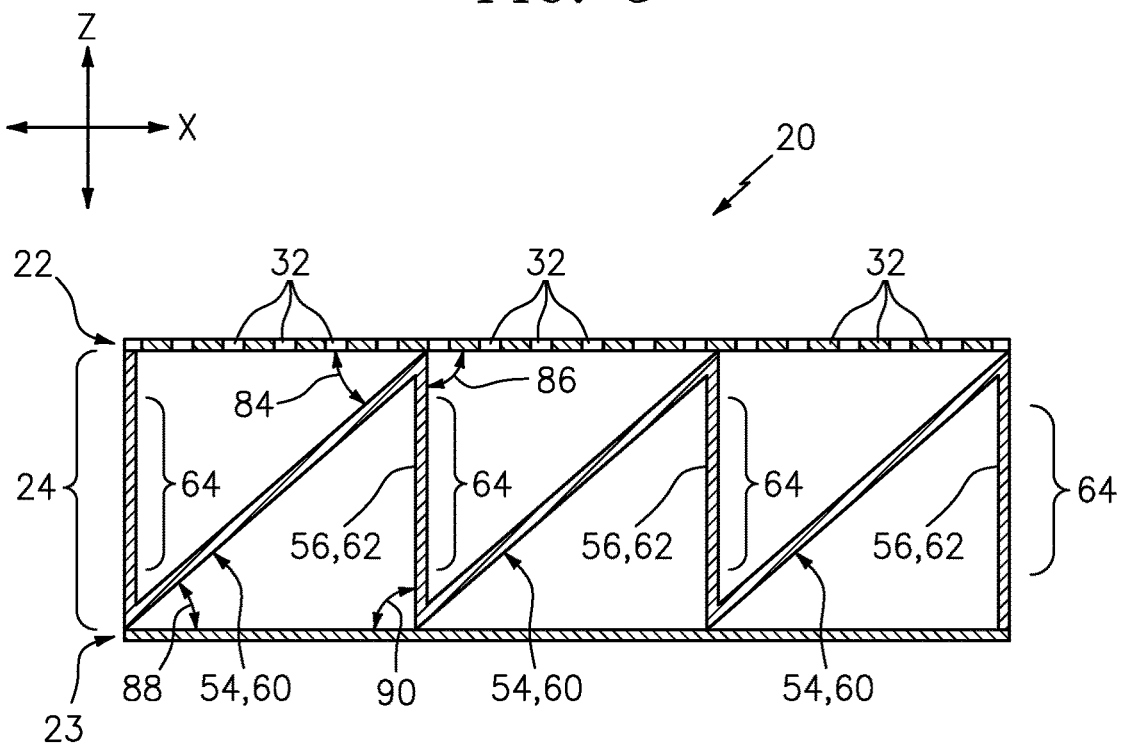
FIG. 7 is a partial side sectional illustration of the acoustic panel with another cellular core.

Each corrugation 66 at its first skin peak 68 vertically engages (e.g., contacts) and may be connected (e.g., bonded and/or otherwise attached) to the first skin 22. Each baffle 60 is angularly offset from the first skin 22 by a first skin-baffle included angle 84. This first skin-baffle included angle 84 may be an acute angle. The first skin-baffle included angle 84 of FIG. 6, for example, may be between twenty degrees (20°) and seventy degrees (70°); e.g., exactly or about (e.g., +/−1°) forty-five degrees (45°). Similarly, each septum 62 is angularly offset from the first skin 22 by a first skin-septum included angle 86. This first skin-septum included angle 86 may be an acute angle, and may be equal to (or different than) the first skin-baffle included angle 84. The first skin-septum included angle 86 of FIG. 6, for example, may be between twenty degrees (20°) and seventy degrees (70°); e.g., exactly or about (e.g., +/−1°) forty-five degrees (45°). The present disclosure, however, is not limited to such exemplary angles. In the embodiment of FIG. 7, for example, the first skin-septum included angle 86 is different (e.g., greater) than the first skin-baffle included angle 84. The first skin-septum included angle 86 of FIG. 7, for example, may be between sixty-five degrees (65°) and ninety degrees (90°); e.g., exactly or about (e.g., +/−1°) ninety degrees (90°).

Referring to FIG. 6, each corrugation 66 at one or each of its second skin peaks 76 vertically engages (e.g., contacts) and may be connected (e.g., bonded and/or otherwise attached) to the second skin 23. Each baffle 60 is angularly offset from the second skin 23 by a second skin-baffle included angle 88. This second skin-baffle included angle 88 may be an acute angle. The second skin-baffle included angle 88 of FIG. 6, for example, may be between twenty degrees (20°) and seventy degrees (70°); e.g., exactly or about (e.g., +/−1°) forty-five degrees (45°). Similarly, each septum 62 is angularly offset from the second skin 23 by a second skin-septum included angle 90. This second skin-septum included angle 90 may be an acute angle, and may be equal to (or different than) the second skin-baffle included angle 88. The second skin-septum included angle 90 of FIG. 6, for example, may be between twenty degrees (20°) and seventy degrees (70°); e.g., exactly or about (e.g., +/−1°) forty-five degrees (45°). The present disclosure, however, is not limited to such exemplary angles. In the embodiment of FIG. 7, for example, the second skin-septum included angle 90 is different (e.g., greater) than the second skin-baffle included angle 88. The second skin-septum included angle 90 of FIG. 7, for example, may be between sixty-five degrees (65°) and ninety degrees (90°); e.g., exactly or about (e.g., +/−1°) ninety degrees (90°).

Referring to FIG. 6, with the foregoing configuration, each corrugated structure 46 and each of its corrugations 66 extend vertically across the cellular core height 40 (see FIG. 1) between the first skin 22 and the second skin 23. Each corrugated structure 46 may thereby divide the one or more internal chambers 50 within a respective chamber array 52 into one or more first cavities 92A and one or more corresponding second cavities 92B. The first cavities 92A are located within the cellular core 24 on a first side (e.g., first skin side) of the respective corrugated structure 46. The second cavities 92B are located within the cellular core 24 on a second side (e.g., second skin side) of the respective corrugated structure 46.

Each of the first cavities 92A of FIG. 6 is fluidly coupled with a respective one of the second cavities 92B through the respective at least one fluid passthrough region 64. Each respective set of fluidly coupled cavities 92A and 92B collectively forms a respective one of the internal chambers 50 within the cellular core 24. Each internal chamber 50 of FIG. 6 extends vertically between and to the first skin 22 and the second skin 23. Each internal chamber 50 thereby extends diagonally (e.g., vertically and longitudinally) from the first skin 22, along a respective longitudinally neighboring pair of the baffles 60 and through a respective septum 62 (via the at least one fluid passthrough region 64), to the second skin 23. Each internal chamber 50 of FIG. 6 extends longitudinally, along the each of the acoustic panel elements 22, 23 and 62, between and to the respective longitudinally neighboring pair of the baffles 60. Each internal chamber 50 of FIG. 3 extends laterally, along the each of the corrugated structure elements 60 and 62, between and to a respective laterally neighboring pair of the chamber sidewalls 48.

Figure 8:
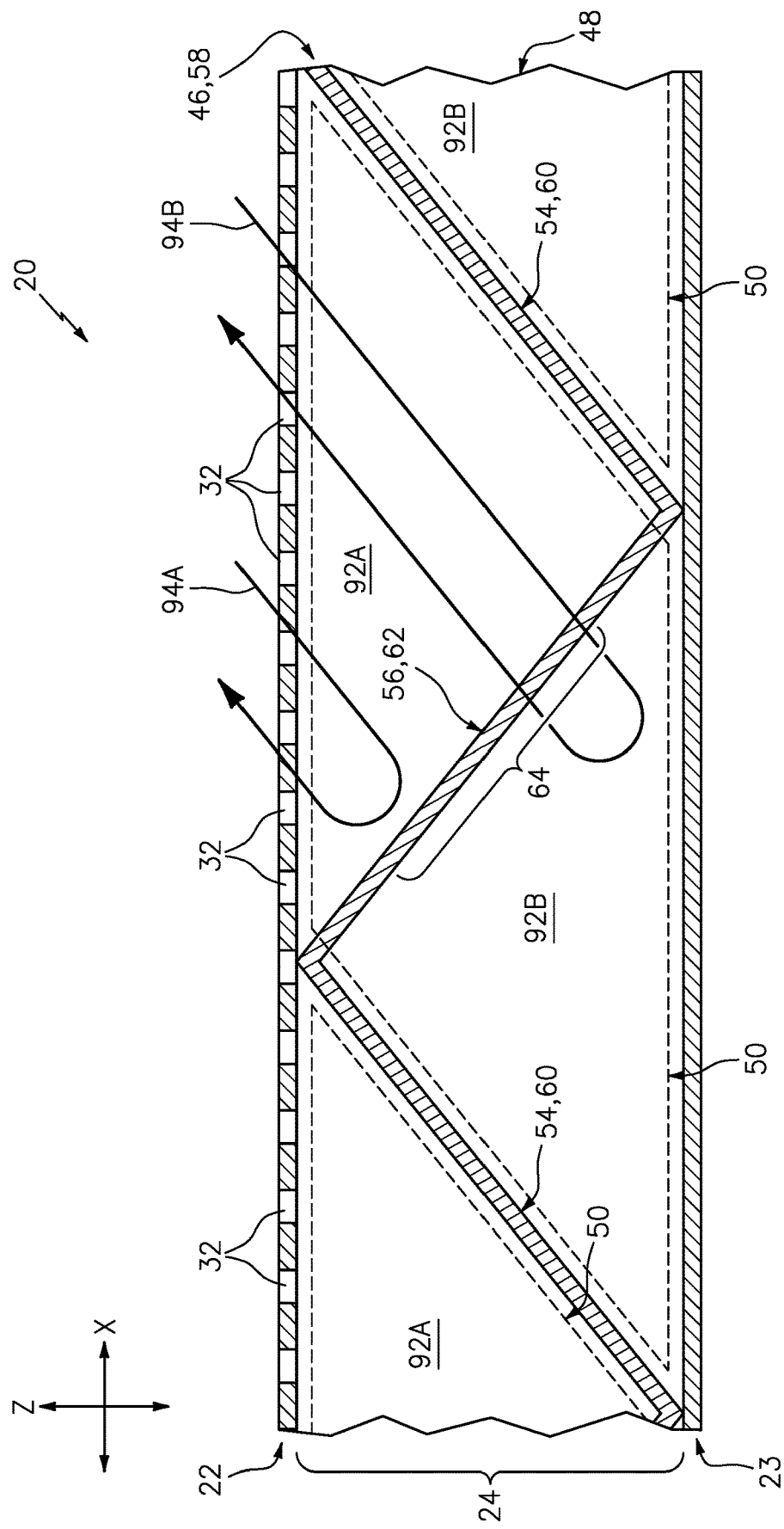
FIG. 8 is an enlarged illustration of a portion of the acoustic panel in FIG. 2 depicted with schematic sound wave trajectories.

Referring to FIG. 8, the acoustic panel 20 is configured as a double-degree of freedom (DDOF) acoustic panel. Sound waves entering each internal chamber 50, for example, may follow a plurality of trajectories 94A and 94B (generally referred to as "94"), which trajectories 94 are illustrated to schematically depict which cavities 92A and 92B are involved rather than specific sound wave paths. The sound waves, of course, may also follow one or more additional trajectories not shown in FIG. 8. For example, one or more additional sound wave trajectories may exist due to interactions between the first cavity 92A and the second cavity 92B that produce additional reflections.

The first trajectory 94A extends away from the from the respective first skin perforations 32, is reversed by the respective corrugated structure 46 (e.g., solid, non-porous portion(s) of the respective septum 62), and extends back to the respective first skin perforations 32. The second trajectory 94B extends away from the respective first skin perforations 32 and through the respective at least one fluid passthrough region 64, is reversed by the second skin 23, and extends back through the respective at least one fluid passthrough region 64 to the respective first skin perforations 32. With such an arrangement, each internal chamber 50 may reverse phase of a plurality of frequencies of the sound waves using known acoustic reflection principles and subsequently direct the reverse phase sound waves out of the acoustic panel 20 through the first skin perforations 32 to destructively interfere with other incoming noise waves.

Figure 9:
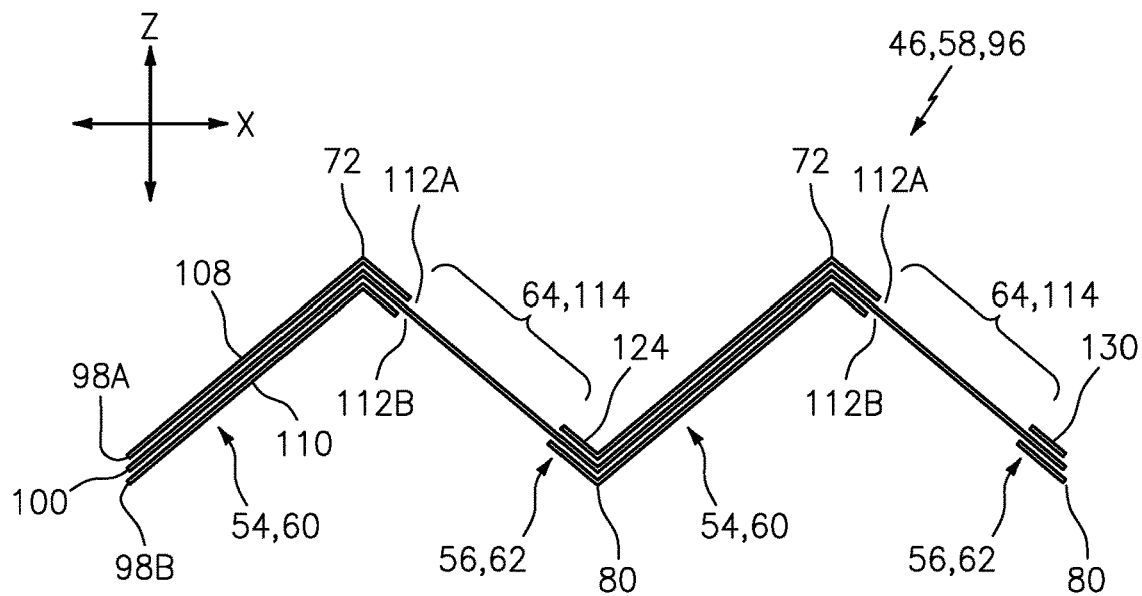
FIG. 9 is a side schematic illustration of the corrugated structure with multiple layers.

One or more or each of the cellular core elements (e.g., 46, 48, 54, 56, 60 and/or 62) may be formed from a plurality of different materials and/or a plurality of different members; e.g., layers. The corrugated structure 46 of FIGS. 9 and 10, for example, is configured with a multi-layered body 96. This multi-layered body 96 includes one or more structural, fluid barrier layers 98A and 98B (generally referred to as "98") (e.g., fluid non-passthrough layers, non-porous material layers) and at least one fluid passthrough layer 100 (e.g., porous material layer, perforated material layer, etc.). The passthrough layer 100 of FIG. 9 is configured (e.g., laid up) with the first barrier layer 98A and the second barrier layer 98B. More particularly, the passthrough layer 100 of FIG. 9 is disposed (e.g., sandwiched) between and attached (e.g., bonded) to the first barrier layer 98A and the second barrier layer 98B.

Each of the barrier layers 98 is formed (e.g., only) from fluid barrier (e.g., fluid non-passthrough) material which blocks fluid passage/fluid flow thereacross. Each barrier layer 98, for example, may be configured from a sheet of solid, non-porous material; e.g., material without open cell pores. Examples of the barrier material include, but are not limited to, metal, polymer (e.g., thermoplastic or thermoset material), a fiber reinforced composite (e.g., fiber reinforcement such as, but not limited to, fiberglass, carbon fiber and/or aramid fibers within a polymer matrix), or a combination thereof.

Figure 11A:
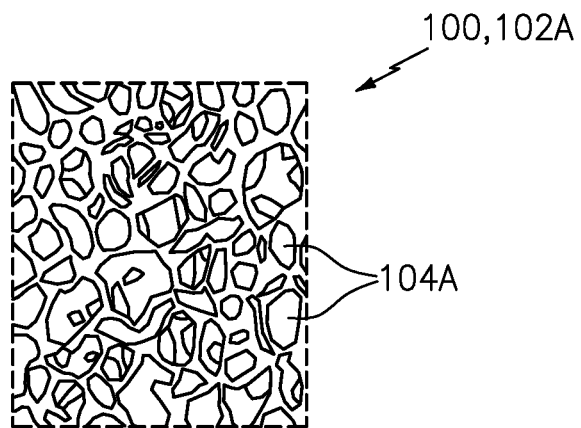
FIGS. 11A-C are close up illustrations of various fluid passthrough materials.
Figure 11B:
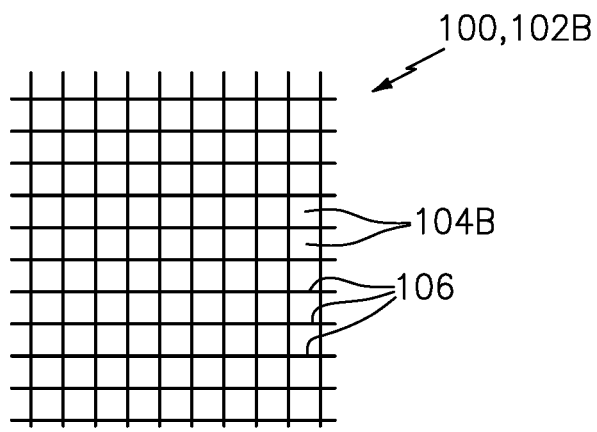
Figure 11C:
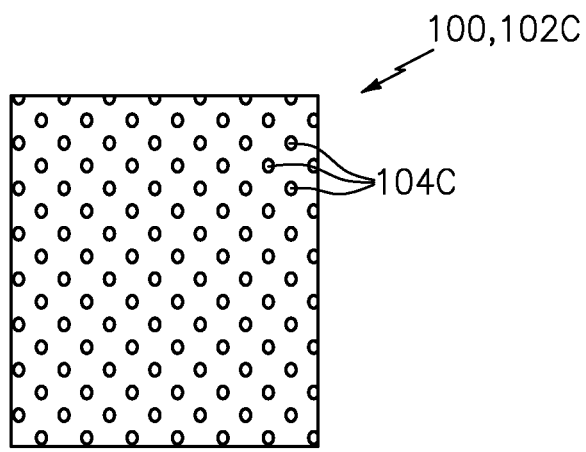

Each passthrough layer 100 may be formed (e.g., only) from fluid passthrough material which provides for fluid passage/fluid flow thereacross. This passthrough material may be porous material such as, but not limited to, material with open cell pores, material with interstices (e.g., mesh, or other woven or matted material), etc. The passthrough material may also or alternatively be material configured with one or more (e.g., micro) perforations. The passthrough material, more particularly, is configured with one or more apertures, which apertures form one or more discrete fluid paths and/or one or more interconnected networks of fluid paths through the passthrough material. For example, the passthrough material of FIG. 11A is open cell porous material 102A with a network of open cell pores 104A. The passthrough material of FIG. 11B is porous mesh material 102B with a network of interstices 104B formed between mesh elements 106; e.g., threads, strands, members, etc. The passthrough material of FIG. 11C is porous or non-porous material 102B with one or more perforations 104C (e.g., through-holes) extending therethrough. Examples of the passthrough material include, but are not limited to, metal, polymer (e.g., thermoplastic or thermoset material), a fiber reinforced composite (e.g., fiber reinforcement such as, but not limited to, fiberglass, carbon fiber and/or aramid fibers within a polymer matrix), or a combination thereof, which materials may be porous or non-porous as described above.

Figure 12A:
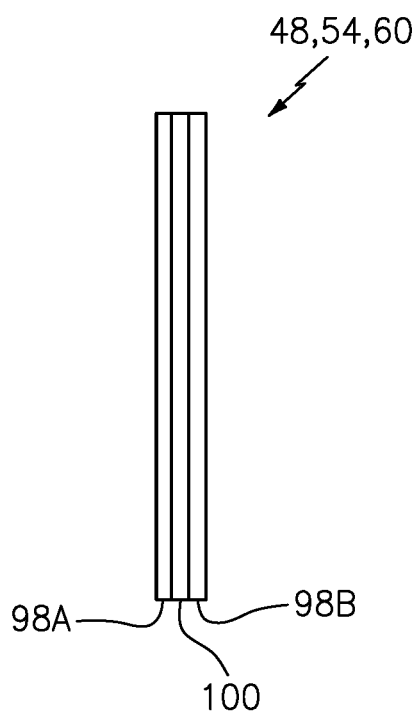
FIGS. 12A-D are side illustrations of various core element constructions.
Figure 12B:
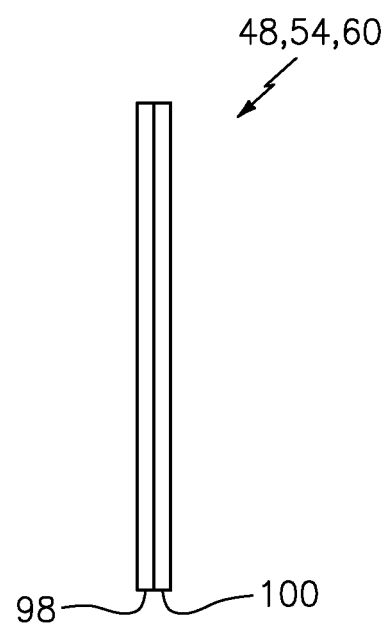
Figure 12C:
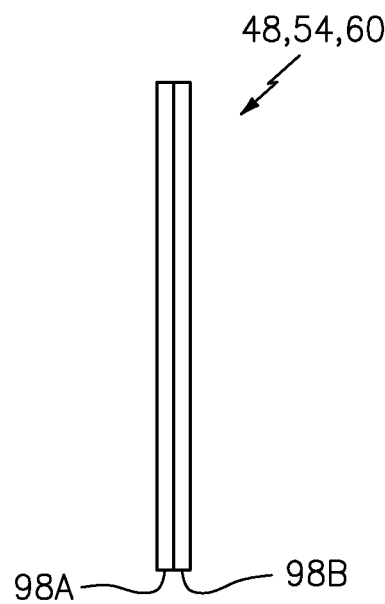
Figure 12D:
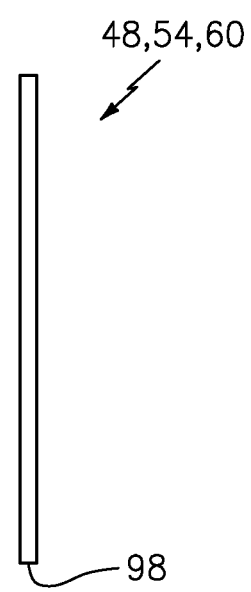

Referring to FIG. 12A, one or more or each of the cellular core elements 48, 54 and 60 may be formed from the stack of layers 98 and 100; e.g., see the baffles 60 in FIG. 9. Within these elements 48, 54 and 60, one or each of the barrier layers 98 may be uninterrupted; e.g. not include any apertures. The passthrough layer 100 may be (e.g., completely) covered/overlapped by at least one of the barrier layers 98. The passthrough layer 100 of FIG. 12A, for example, may be embedded/sandwiched between the barrier layers 98. The material of each barrier layer 98 may thereby block, cover, obstruct the apertures within the passthrough material of the passthrough layer 100. Of course, one or more or each of the cellular core elements 48, 54 and 60 may be configured without one of the barrier layers 98 and/or without the passthrough layer 100 as shown, for example, in FIGS. 12B-D. With the foregoing configurations of FIGS. 12A-D, an entirety of each face (e.g., baffle face 108, 110; see FIG. 9) of the respective cellular core elements 48, 54, 60 is formed by an uninterrupted portion of a respective one of the barrier layers 98 and its barrier material.

Figure 10:
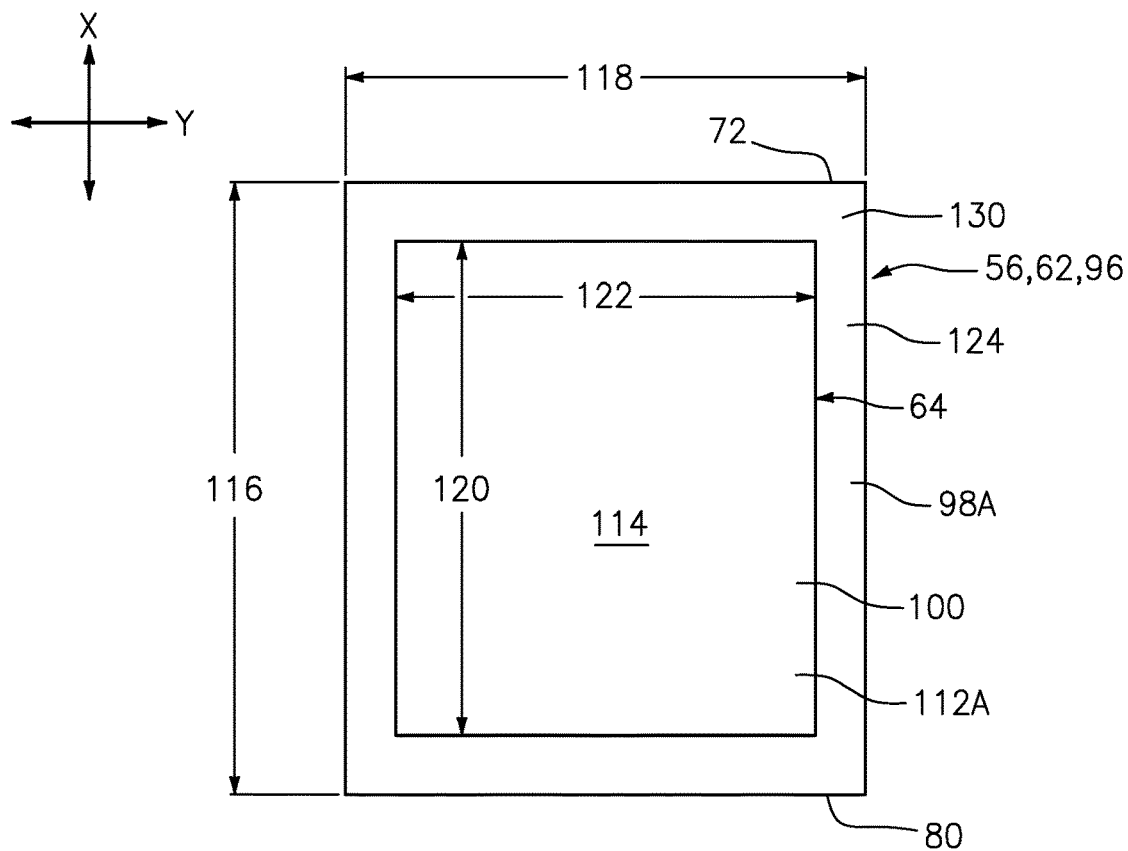
FIG. 10 is an illustration of a septum included in the corrugated structure of FIG. 9.

Referring to FIGS. 9 and 10, one or more or each of the septums 62 may also be formed from the stack of layers 98 and 100. However, by contrast to the baffles 60 of FIG. 9 (see also FIGS. 12A-12D), each barrier layer 98 is configured with at least one interruption 112A, 112B (generally referred to as "112"); e.g., an aperture such as a window, an opening, a perforation, etc. Each interruption 112 of FIGS. 9 and 10, for example, is configured as an aperture (e.g., a window or opening). The interruption 112A in the first barrier layer 98A is aligned with the interruption 112B in the second barrier layer 98B. The interruptions 112 also have common cross-sectional geometries (e.g., shapes and sizes); however, the present disclosure is not limited thereto. Each of these interruptions 112 exposes (e.g., uncovers, makes visible, etc.) a respective portion 114 of the passthrough layer 100 and its passthrough material. This exposed passthrough portion 114 forms the fluid passthrough region 64 in the respective septum 62.

Referring to FIG. 10, the septum 62 has a septum length 116 and a septum width 118. The fluid passthrough region 64 (and the respective portion of the passthrough layer 100 and its passthrough material) has a passthrough region length 120 and a passthrough region width 122. The passthrough region length 120 of FIG. 10 is less than the septum length 116. The passthrough region width 122 of FIG. 10 is less than the septum width 118. The fluid passthrough region 64 of FIG. 10 is also positioned intermediately (e.g., centered) in the respective septum 62. The fluid passthrough region 64 of FIG. 10 (see also FIG. 9) is thereby surrounded by a (e.g., annular, border) fluid barrier region 124 of the respective septum 62.

Figure 13:
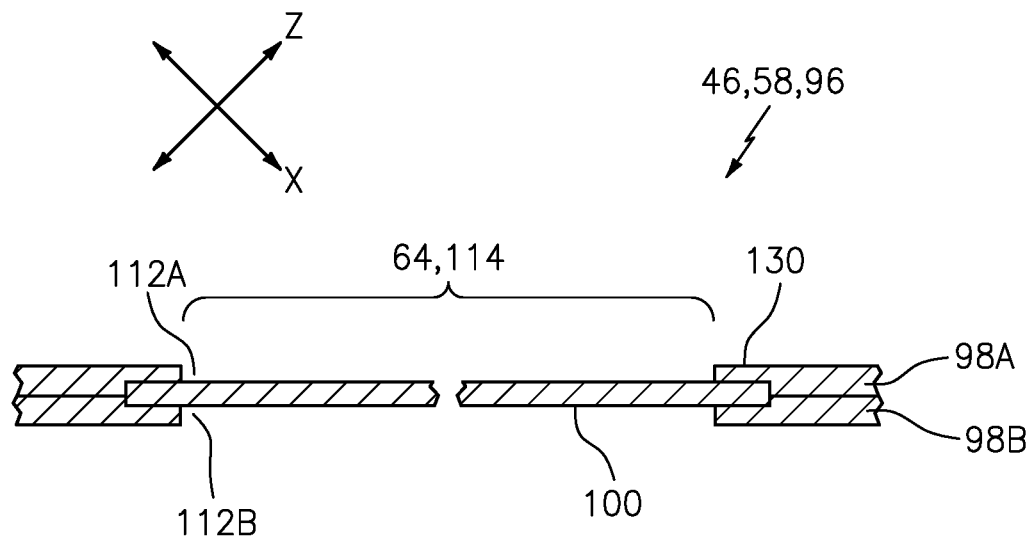
FIG. 13 is a partial sectional illustration of another septum taken along line 13-13 in FIG. 14.
Figure 14:
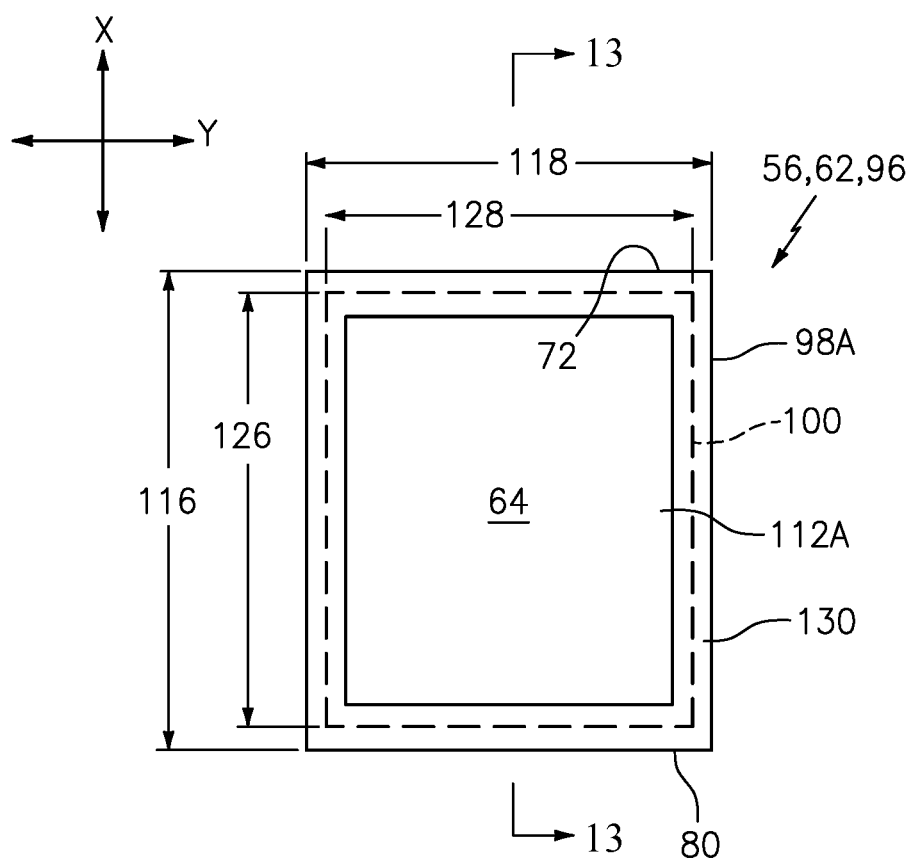
FIG. 14 is an illustration of the septum of FIG. 13.
Figure 15:
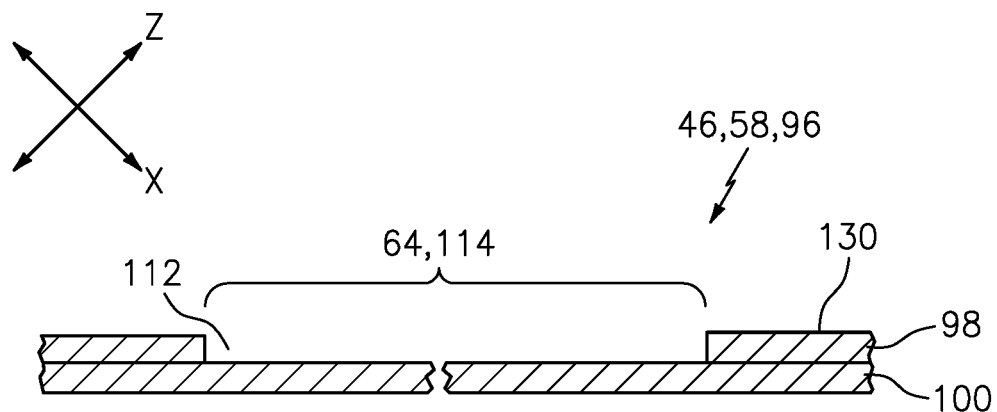
FIG. 15 is a partial sectional illustration of another septum taken along line 15-15 in FIG. 16.
Figure 16:
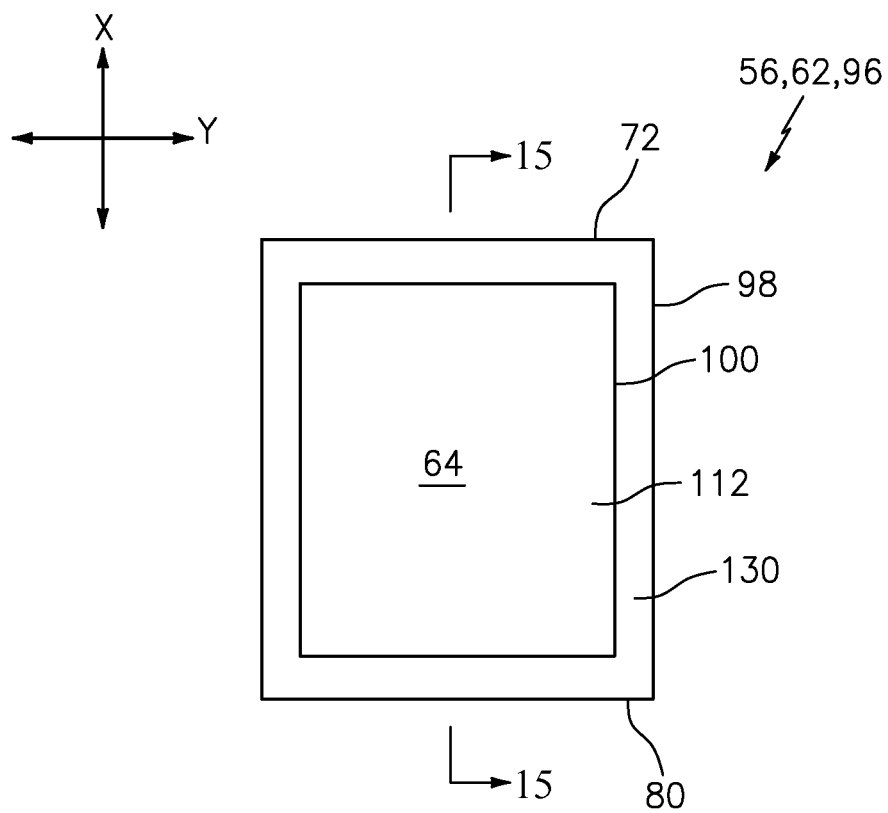
FIG. 16 is an illustration of the septum of FIG. 15.

Referring to FIGS. 9 and 10, the barrier region 124 may be (e.g., completely) formed by the stack of the layers 98A, 100 and 98B. A (e.g., annular, border) portion of the passthrough layer 100 and its passthrough material, for example, may be embedded/sandwiched between respective (e.g., annular, border) portions of the barrier layers 98. These portions of the barrier layers 98 also respectively form peripheral borders of the interruptions 112. A length and/or a width of the passthrough layer 100 within the respective septum 62 of FIG. 10 are respectively equal to the septum length 116 and/or the septum width 118 (and each barrier layer). However, in other embodiments, a portion of the barrier region 124 may also (or alternatively) be formed by a stack of the layers 98A and 98B as shown, for example, in FIGS. 13 and 14. A length 126 and/or a width 128 of the passthrough layer 100 within the respective septum 62 of FIG. 14, for example, are respectively less than the septum length 116 and/or the septum width 118. In still other embodiments, referring to FIGS. 15 and 16, the respective septum 62 may omit one of the barrier layers 98. With the foregoing configurations of FIGS. 9, 13 and 15, each face 130 of the respective septum 62 is partially formed by the respective barrier portion and its barrier material and the respective passthrough portion and its passthrough material.

Figure 17:
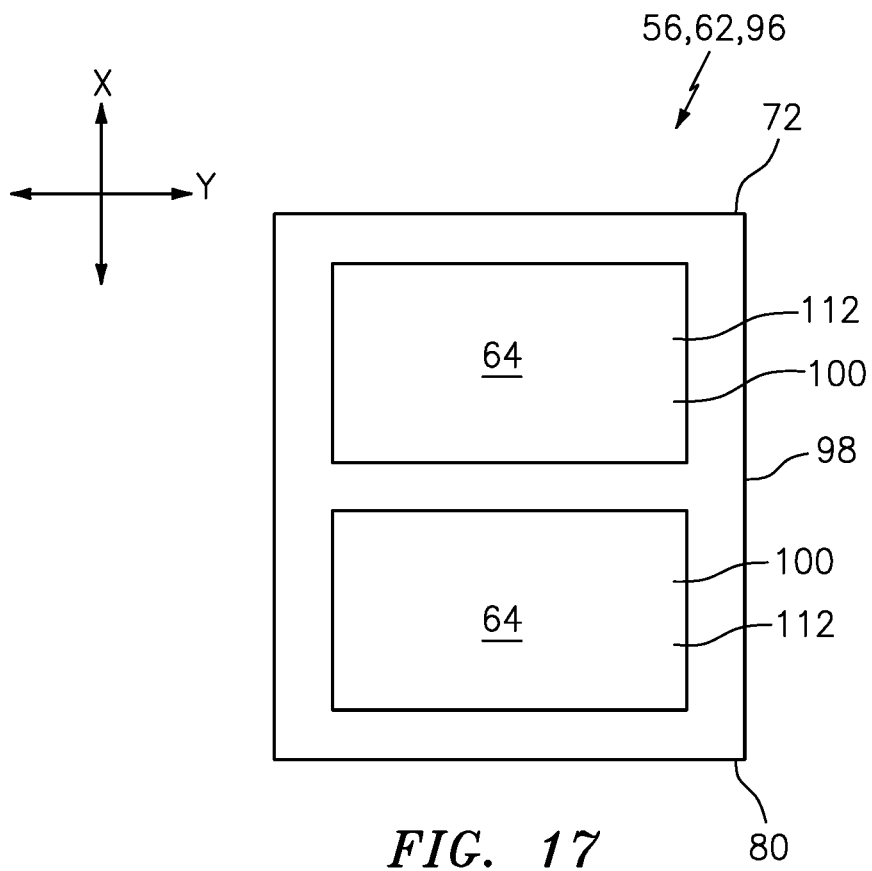
FIGS. 17 and 18 are illustrations of other septums with multiple fluid passthrough regions.
Figure 18:
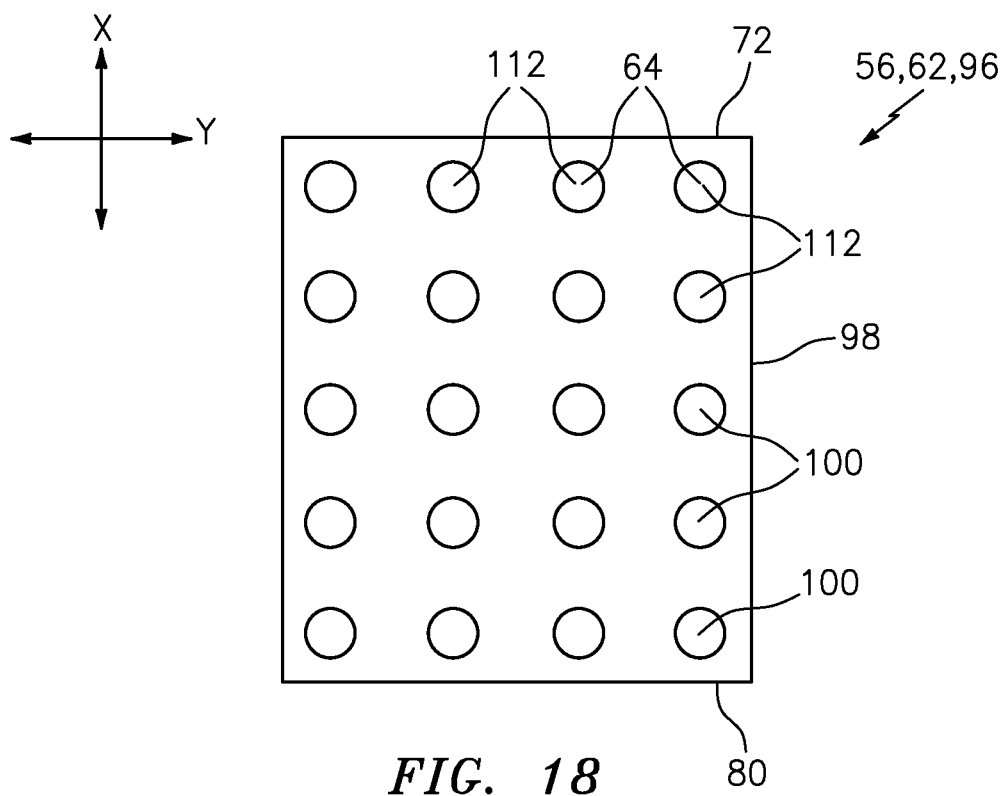

In some embodiments, referring to FIG. 10, each septum face 130 has a face area, which is defined by the septum length 116 and the septum width 118. Each fluid passthrough region 64 and each associated interruption 112 has a cross-sectional area when viewed, for example, in a plane parallel with the respective septum face 130. The cross-sectional area is defined by the length 120 and the width 122 of the element 64, 112. The cross-sectional area of FIG. 10 is at least one half (½) of the face area; e.g., greater than seventy-five percent (75%) of the face area, but less than one-hundred percent (100%) of the face area. However, in other embodiments, the cross-sectional area may be less than one half (½) of the face area as shown, for example, in FIGS. 17 and 18. In such embodiments, each barrier material layer 98 may include one or more additional interruptions 112 in order to provide the respective septum 62 with one or more additional fluid passthrough regions 64; e.g., exposed portions of passthrough material.

Each of the fluid passthrough regions 64 described above is formed by at least one layer of the passthrough material. In addition to providing a path for fluid travel across the septums 62, the passthrough material may also provide acoustic linearity as compared, for example, to a septum without the passthrough material; e.g., a septum formed with open perforations. The passthrough material may also or alternatively provide the septum 62 with a higher acoustic impedance as compared, for example, to a septum without the passthrough material. Inclusion of the passthrough material, of course, may also or alternative provide the acoustic panel 20 with one or more other acoustic and/or structural properties.

Figure 19A:
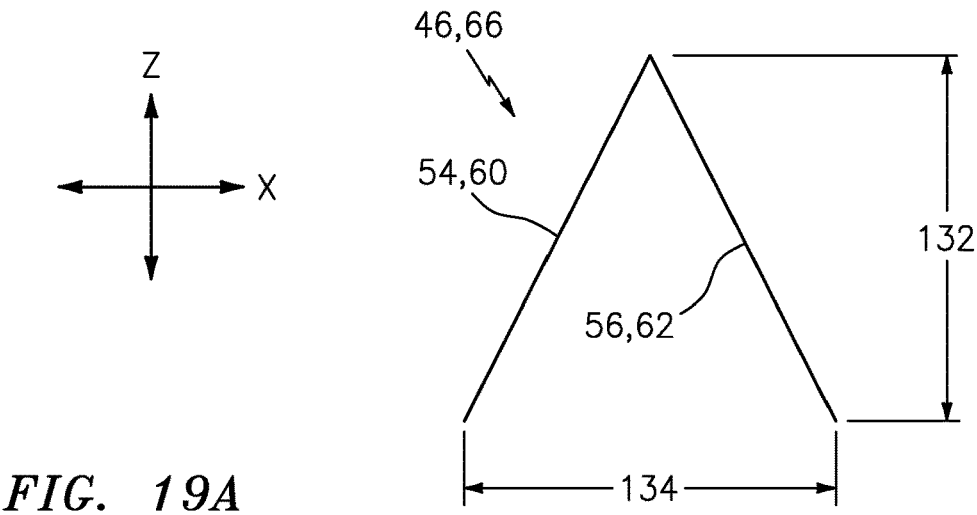
FIGS. 19A-C are partial sectional illustrations of the acoustic panel with various aspect ratios.
Figure 19B:
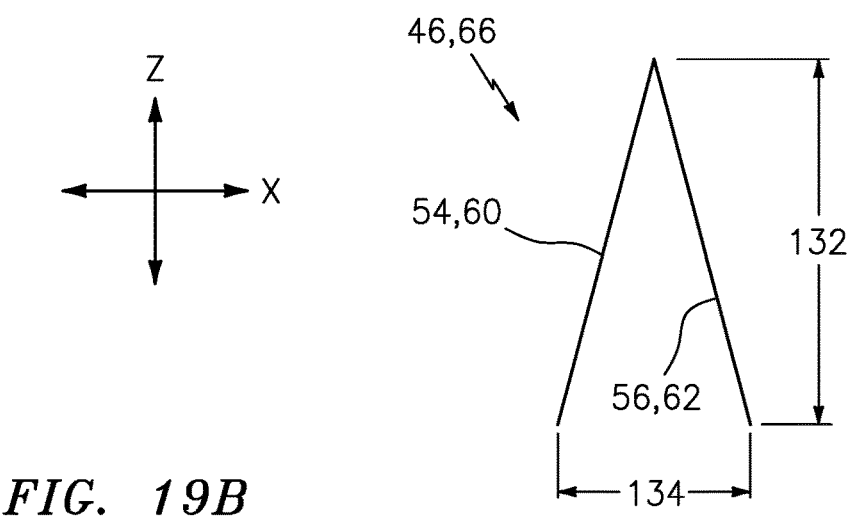
Figure 19C:
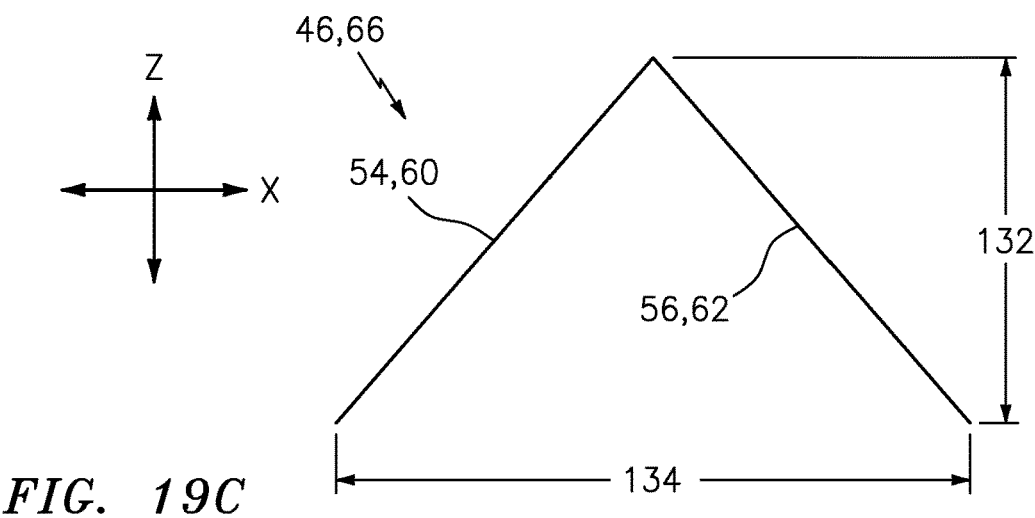

Referring to FIGS. 19A-C, each corrugated structure 46 has an aspect ratio. This aspect ratio may be determined by dividing a vertical height 132 of the respective corrugated structure 46 by a longitudinal length 134 of a corrugation 66 in the respective corrugated structure 46. The aspect ratio may be 1:1 (see FIG. 19A), greater than 1:1 (e.g., see FIG. 19B) or less than 1:1 (e.g., see FIG. 19C).

The cellular core 24 and one or more of its elements (e.g., 46, 48) may be formed using various formation techniques. For example, the barrier and the passthrough materials may be cut and laid up to provide a multilayered sheet of material. This multilayered sheet of material may subsequently be manipulated (e.g., folded, cut, etc.) to form the cellular core 24. The multilayered sheet of material, for example, may be folded (e.g., using origami and/or kirigami techniques) into a three-dimensional body that includes/forms one, some or all of the cellular core elements (e.g., 46, 48, 54, 56, 60 and 62). Other suitable formation techniques include, but are not limited to, compression molding, injection molding, stamping, machining and additive manufacturing.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An acoustic panel, comprising:
a perforated first skin;
a second skin; and
a corrugated structure between and connected to the perforated first skin and the second skin, the corrugated structure including a first baffle, a first septum, first material and second material configured with the first material;
the first baffle formed by an uninterrupted portion of the first material; and
the first septum formed by a portion of the second material that is exposed through an interruption in the first material;
wherein the corrugated structure includes a layer of the first material and a layer of the second material that is laid up with and attached to the layer of the first material; wherein the corrugated structure further includes a layer of third material; the layer of the second material is sandwiched between the layer of the first material and the layer of the third material; the first baffle is further formed by an uninterrupted portion of the third material; and the portion of the second material is further exposed through an interruption in the third material.

2. The acoustic panel of claim 1, wherein
the first material comprises non-porous material; and
the second material comprises porous material.

3. The acoustic panel of claim 1, wherein the second material comprises mesh.

4. The acoustic panel of claim 1, wherein the second material comprises thermoplastic material.

5. The acoustic panel of claim 1, wherein
the first septum has a first dimension in a first direction; and
the layer of the second material has a second dimension in the first direction that is equal to the first dimension.

6. The acoustic panel of claim 1, wherein
the first septum has a first dimension in a first direction; and
the layer of the second material has a second dimension in the first direction that is less than the first dimension.

7. The acoustic panel of claim 1, wherein an entirety of a face the first baffle is formed by the uninterrupted portion of the first material.

8. The acoustic panel of claim 1, wherein a face of the first septum is at least partially formed by the portion of the second material.

9. The acoustic panel of claim 8, wherein the face of the first septum is further formed by a second portion of the first material that defines the interruption through which the portion of the second material is exposed.

10. The acoustic panel of claim 1, wherein
a face of the first septum has a face area; and
the interruption in the first material has a cross-sectional second area that is at least one half of the face area.

11. The acoustic panel of claim 1, wherein the first septum is further formed by a second portion of the second material that is exposed through a second interruption in the first material.

12. The acoustic panel of claim 1, wherein
the corrugated structure further includes a second baffle;
a chamber extends from the perforated first skin, along the first baffle and the second baffle, to the second skin;
the first septum divides the chamber into a first cavity and a second cavity; and
the second cavity is fluidly coupled with the first cavity through one or more apertures the first septum.

13. The acoustic panel of claim 12, further comprising:
a plurality of sidewalls between and connected to the perforated first skin and the second skin, the plurality of sidewalls including a first sidewall and a second sidewall;
the chamber extending from the first sidewall, along the first baffle and the second baffle, to the second sidewall.

14. The acoustic panel of claim 1, wherein
the first baffle is connected to the first septum;
the first baffle extends between the perforated first skin and the second skin; and
the first septum extends between the perforated first skin and the second skin.

* * * * *